(No Model.)

D. E. POWERS.
Tube Machine.

No. 240,542.    Patented April 26, 1881.

WITNESSES    INVENTOR
    By Attorneys (No Model.) 5 Sheets—Sheet 3.
D. E. POWERS.
Tube Machine.
No. 240,542. Patented April 26, 1881.
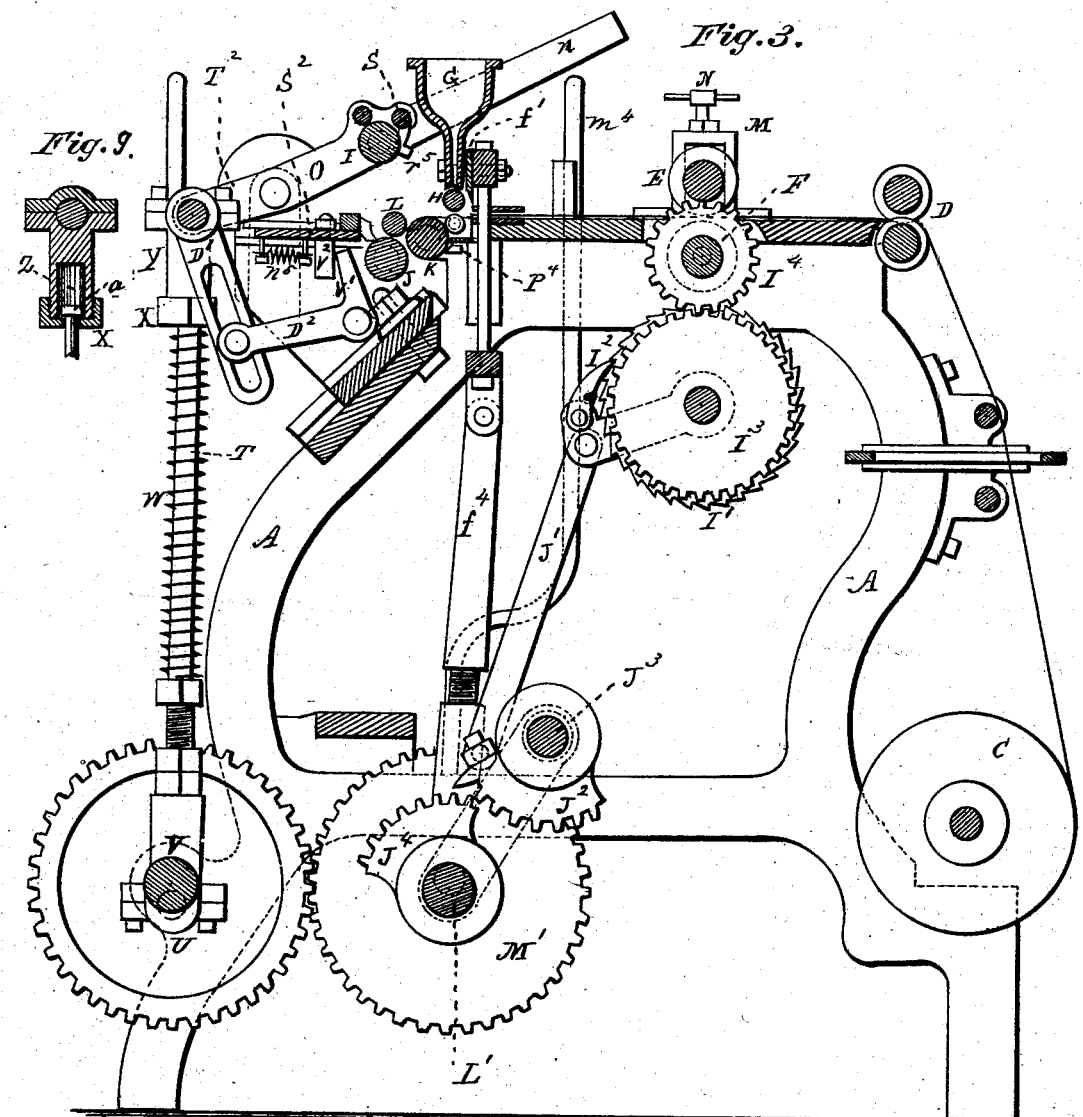
Fig. 3.
Fig. 9.
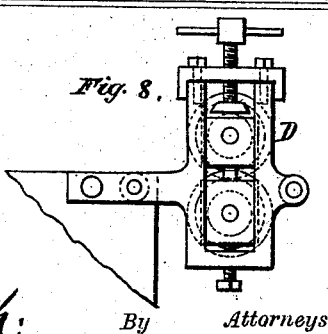
Fig. 8.
WITNESSES
INVENTOR (No Model.) 5 Sheets—Sheet 4.

D. E. POWERS.
Tube Machine.

No. 240,542. Patented April 26, 1881.

WITNESSES

INVENTOR (No Model.)

D. E. POWERS.
Tube Machine.

No. 240,542. Patented April 26, 1881.

WITNESSES

INVENTOR

UNITED STATES PATENT OFFICE.

DANIEL E. POWERS, OF NEW YORK, ASSIGNOR TO STEPHEN W. WOOD, OF CORNWALL, N. Y.

TUBE-MACHINE.

SPECIFICATION forming part of Letters Patent No. 240,542, dated April 26, 1881.

Application filed February 28, 1881. (No model.)

*To all whom it may concern:*

Be it known that I, DANIEL E. POWERS, of the city, county, and State of New York, have invented new and useful Improvements in Machines for Rolling Paper Tubes; and I do hereby declare that the following is a full, clear, and exact description thereof, reference being had to the accompanying drawings, making part of this specification.

My invention relates to rolling a series of paper tubes at once upon a mandrel, with paste only on the last ends of the strips to prevent them unrolling; and it consists, substantially, of the mechanism herein set forth.

Like letters indicate corresponding parts in all the figures.

Figure 1:
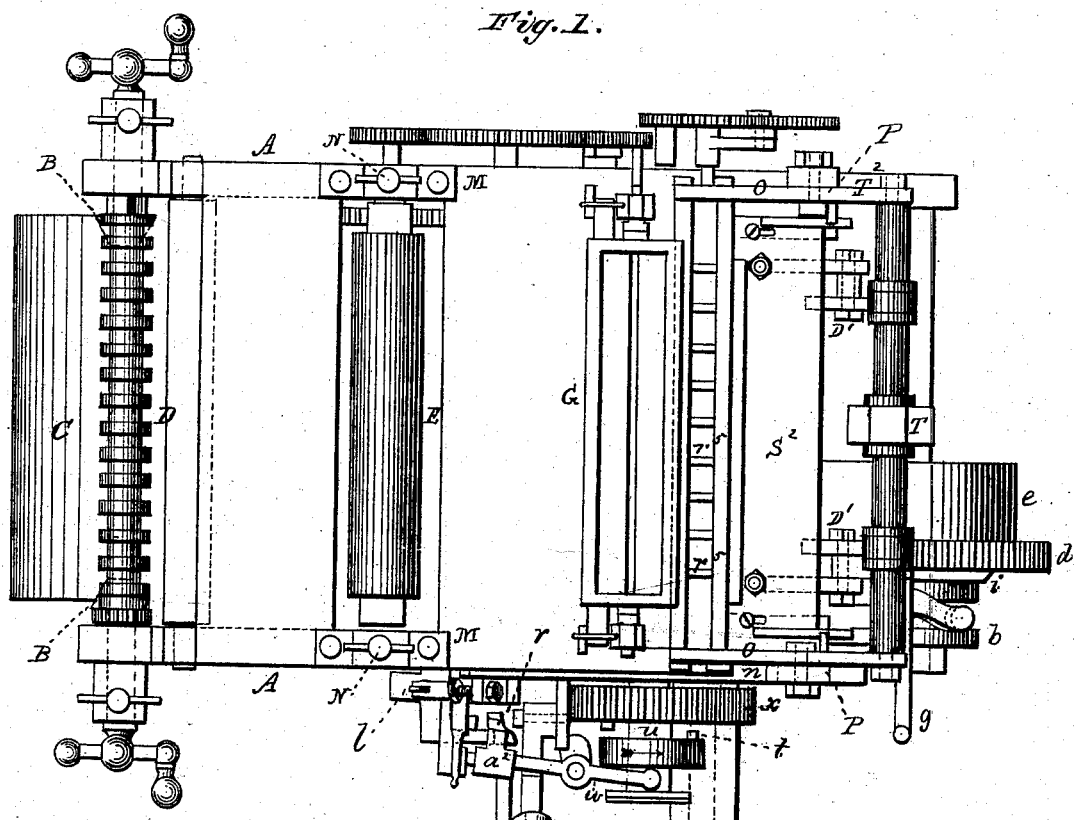
Figure 6:
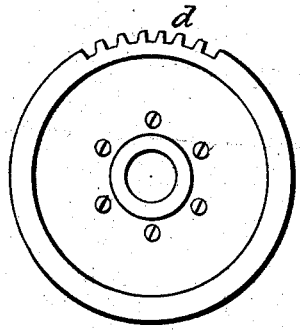
Figure 5:
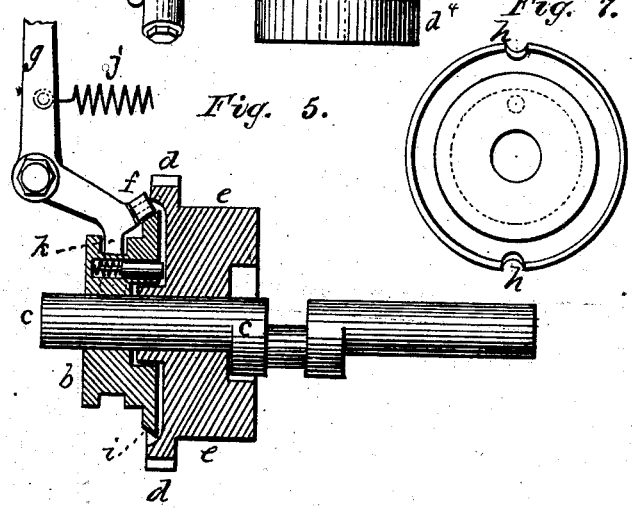
Figure 7:
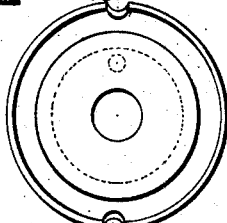
Figure 2:
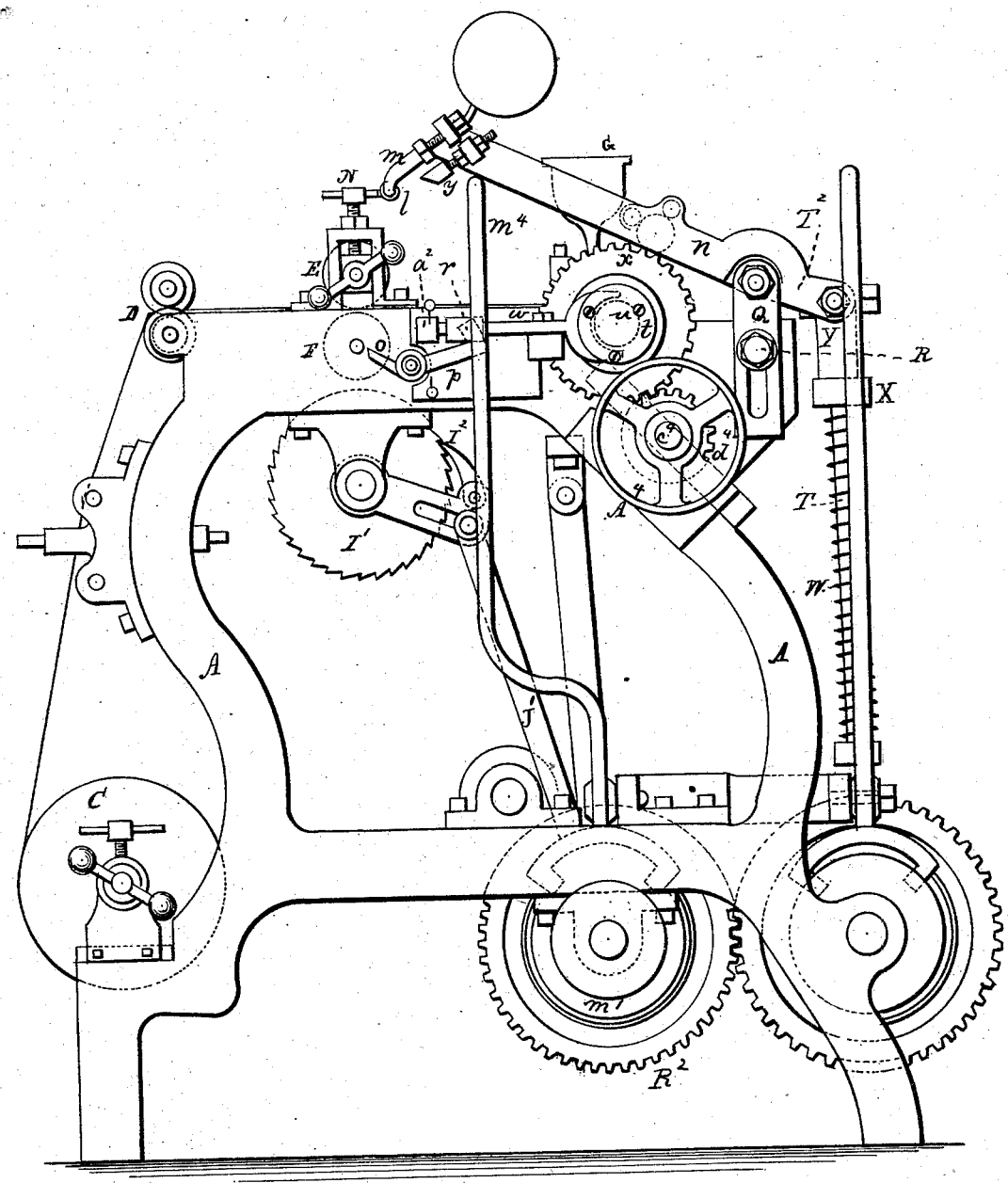
Figure 4:
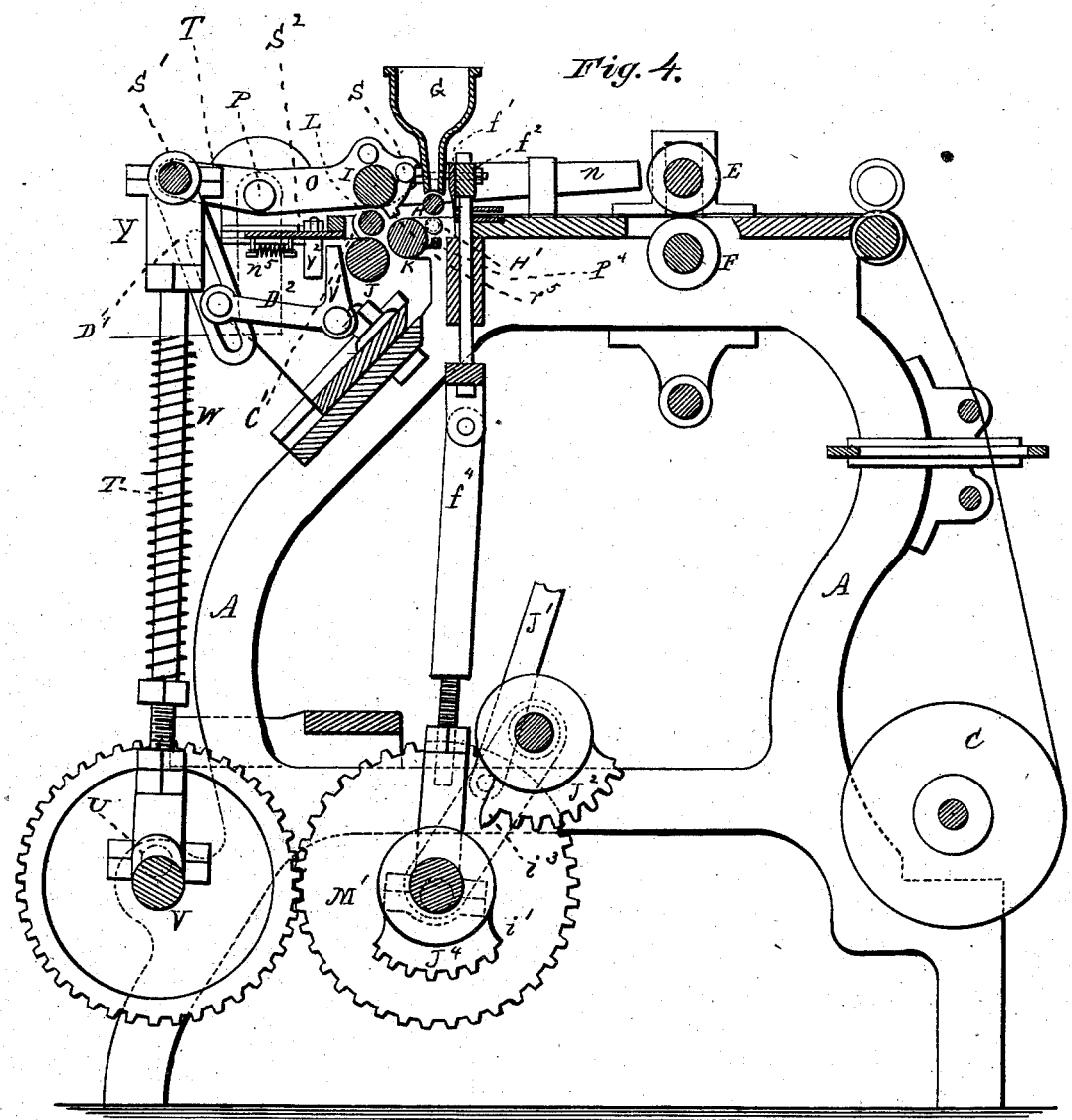
Figure 10:
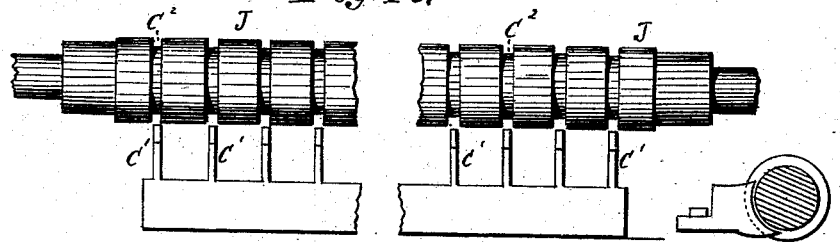
Figure 12:
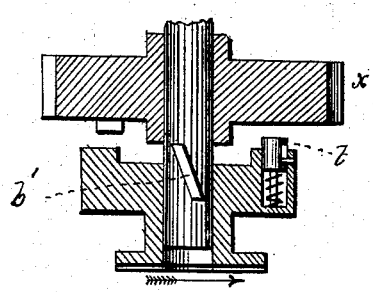
Figure 11:
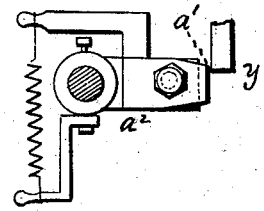
Figure 13:
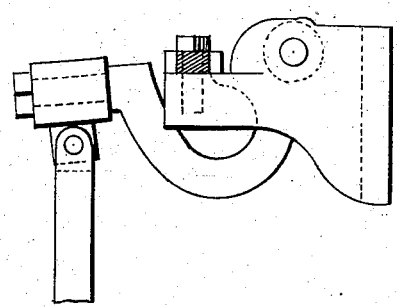

Figure 1 represents a plan of a machine complete for rolling a series of paper tubes at once; Fig. 2, side elevation thereof; Fig. 3, vertical longitudinal section; Fig. 4, also vertical longitudinal section, with rolling mechanism in different position; Fig. 5, section of a loose gear-wheel and sliding clutch on the shaft of the cog-wheel, the cog-wheel rotating constantly, but the clutch making only a half-revolution when engaged with the cog-wheel, to raise and lower the adjustable spring-roller, to admit the mandrel on which to roll the series of tubes, and to remove the same after the tubes shall have been rolled thereon; Fig. 6, side elevation of driving cog-wheel detached; Fig. 7, detached view of the face of the sliding clutch, showing two notches thereon, directly opposite each other, into which the friction-roller on the handle by which it is operated drops alternately, to disengage the clutch at each half-revolution thereof, to stop the crank on the same shaft therewith at each half-revolution, to raise or lower the adjustable spring-roller, as the case may be; Fig. 8, elevation of a series of revolving cutters for dividing the web from the roll of paper into strips of the required width for the tubes, and adjustable journal-boxes for the same detached; Fig. 9, detached view of the elongated journal-box, in which the end of the connecting-rod for raising and lowering the adjustable spring-roller slides, to render this spring-roller self-adjusting on the mandrel in rolling tubes; Fig. 10, detached view of one of the system of rollers fluted, between which the mandrel is placed to roll tubes, and the self-adjusting fingers for directing the ends of the strips of paper around the mandrel and holding them in commencing to roll the tubes; Fig. 11, detached view of latch for holding the clutch in connection to revolve the rollers until the tubes shall have been rolled to the required given thickness; Fig. 12, section of loose cog-wheel and sliding clutch on the shaft of one of the fixed rollers, between which the mandrel is placed, the cog-wheel revolving constantly, but the clutch revolving only when engaged with the cog-wheel and when tubes are being rolled, and to stop the strips of paper by disengaging with the cog-wheel when the tubes shall have attained the required thickness; Fig. 13, side elevation of U-shaped cam detached.

A in the accompanying drawings represents a frame, upon which the several operating parts to roll tubes of paper, or a series of tubes upon one mandrel, are mounted. To the rear end of this frame A, Fig. 1, are placed two cones, B, between and upon which the roll, C, of paper is placed and revolves, and by which cones sufficient friction is obtained to hold the roll of paper firmly and with the required tension while the tubes are being rolled.

The end of the web from the supply-roll C is passed upward and through a series of rotating cutters, D, at the top of the rear end of the frame A, where it is cut into strips of the required width to form the tubes, and in strips it passes thence forward upon the table of the machine, between two flexible rollers, E F, and thence forward beneath the paste-box G, paste-roller H, and knife $f'$ to the system of rollers I J K, between which rollers the mandrel is introduced upon the ends of the strips, in readiness to commence to roll the tubes, as in Fig. 3.

The flexible rollers E F are adjustable, by means of sliding journal-boxes M, to the uppermost roller, E, so that the required pressure may be obtained through the thumb-nuts and screws N to move the strips forward to present the ends thereof between the rollers to receive the mandrel L, Fig. 3.

The rollers J K, upon which the mandrel L is laid upon the ends of the strips, are supported in fixed journal-boxes, and are parallel to each other.

The third roller, I, is mounted in journal-boxes in a vibrating frame, O, so that it may be raised and lowered thereby and rendered yielding and self-adjusting.

The roller I is raised, as in Fig. 3, to permit the mandrel L to be introduced and laid upon the ends of the strips of paper, and to descend and rest upon the mandrel in rolling the tubes thereon, as in Fig. 4.

To raise and lower the roller I the vibrating frame O, upon which it is mounted and revolves, is pivoted at P P in sliding boxes Q Q, secured to the frame A at R, the opposite end of the frame being united by a cross-bar, S. To this cross-bar S' is fitted a spring connecting-rod, T, which is also connected at its opposite end to a crank, U, on the shaft V of the cog-wheel directly beneath, by which connecting-rod T and crank U the frame O is operated to raise and lower the yielding or spring roller I. To obtain the elasticity and pressure required in this connecting-rod T to roll tubes, a spring, W, is provided, which is confined between a nut, X, at the lower end of the elongated journal-box Y and set-nut at the bottom thereof. The upper end of this connecting-rod T enters into a recess, $z$, formed in the lower end of the elongated journal-box Y, and is retained therein by a head, $a$, on the inside of the nut X, (detached view, Fig. 9,) so that when the roller I descends upon the mandrel L to roll the tubes thereon, it may yield by the head $a$ of the spring connecting-rod T sliding up and down in the recess $z$, and so allow the roller I to adjust itself to the tubes as they increase in thickness on the mandrel.

To raise the frame O and spring-roller I thereon to insert the mandrel L upon the ends of the strips and upon the fixed rollers J K in position to commence to roll tubes, the crank U on the shaft V, to which the connecting-rod T is attached, makes a half-revolution, as in Fig. 3; and to lower the roller I upon the mandrel, to inclose it between the three rollers I J K, to roll the tubes, the crank U makes another half-revolution and returns to the point of starting, as in Fig. 4.

The mechanism to operate the crank U intermittently, to raise and lower alternately the spring-roller I, consists of a sliding clutch, $b$, on the shaft $c$, which clutch engages with a corresponding clutch on the face of the gear-wheel $d$, mounted upon the same shaft and running loosely thereon. The gear-wheel $d$ is driven by a belt on its flat surface $e$, and when the friction-roller $f$, secured to the handle $g$, is raised out of one of the notches $h$ and rests on the beveled edge $i$, the clutch $b$ is simultaneously moved forward by the toe $k$ on the lower end of this handle $g$ and engages with the clutch on the face of the gear-wheel $d$, and while the friction-roller $f$ is riding on the edge $i$ the clutches are engaged, and so remain engaged until the crank U shall have made its required half-revolution. When this crank U shall have made its half-revolution the corresponding notch $h$ on the face of the gear-wheel $d$ presents itself, into which the friction-wheel $f$ is forced by the spring $j$ on the handle $g$, and the two clutches are thereby disengaged and the crank stopped at its half-revolution to raise or lower the roller I, as the case may be.

In lowering the roller I, to inclose the mandrel L between the three rollers to roll the tubes thereon, the friction-roller $l$ on the end of the adjustable stem $m$, secured near the end of an arm, $n$, and projecting downward therefrom, said arm $n$ being bolted firmly to and moving up and down with the frame O, strikes the end $o$ of a bell-crank, $p$, on the opposite end of which is a cam, $r$, thereby operating the lever $w$ and uniting the clutch $t$ on the shaft $u$ of the gear-wheel $x$, at the same time permitting the end of the adjustable stem $y$, secured to the same arm $n$, to press down and pass by the end $a'$ of a latch, $a^2$, mounted on the end of the forked lever $w$, thereby holding the clutch $t$ firmly engaged with the cog-wheel $x$, and as the tube increases in thickness on the mandrel L, and thereby raises the roller $l$ off the end of the bell-crank, the stem $y$ rises also and passes above the end $a'$ of the latch $a^2$, releasing the clutch $t$ from the cog-wheel $x$, and permitting the rollers I J K to stop, and when the friction-roller $l$ on the stem $m$ rises off the end $o$ of the bell-crank $p$, the cam $r$ on its opposite end immediately drops down in position to be again raised by the descent of the friction-roller $l$ upon the end $o$, to operate the forked lever $w$, to engage the clutch $t$ with the gear-wheel $x$, to roll the next tubes.

To facilitate the prompt disengaging of the clutch $t$ from the gear-wheel $x$, a spiral feather, $b'$, is secured to the extended end of the shaft of the roller K, and upon which the cog-wheel $x$ and clutch $t$ are mounted and operate. The clutch $t$ revolves in the direction indicated by the arrow, Figs. 1, 12. The spiral feather $b'$ being curved in the same direction, so that the clutch $t$ is held engaged with the gear-wheel $x$ when rolling tubes only by the end of the latch $a'$ bearing against the side of the stem $y$, so that when the side of the stem $y$ is raised above the upper edge of the latch $a'$ when the tubes shall have been rolled to the required thickness, the clutch $t$ instantly disengages itself by its own weight and momentum from the gear-wheel $x$, the spiral feather $b'$ causing the clutch to move faster than the gear-wheel with which it is engaged.

The self-adjusting roller I, secured to the frame O, rests directly upon the mandrel L in rolling tubes, so that as the strips of paper are wound tightly around the mandrel the roller I rises with the increasing thickness of paper thereon and raises the frame O therewith and the stem $y$, secured thereto, so that when the tubes being rolled shall acquire the exact thickness necessary the mechanism will disengage and the rollers and mandrel will stop—the thickness of the tubes on the mandrel governing the stopping of the rolling mechanism—by which construction and operation tubes may be rolled always to a given thickness and be uniform, notwithstanding the strips from the supply-roll may constantly vary in thickness. If the strips from the supply-roll be thin, then a longer piece will be required to roll the tubes to a given thickness; and if the web varies and becomes thicker, then the mechanism just described will compensate for the variation in the thickness of the strips, and shorter pieces be taken, the mandrel being permitted to receive sufficient only to roll the tubes to a uniform thickness.

To paste only the last ends of the strips of paper of which the tubes are formed, to prevent them unrolling, a paste-box, G, and paste-roller H are provided and secured to the side of the knife-bar $f^2$, and in front thereof, which box and roller move up and down therewith.

In order to hold the strips of paper up against the paste-roller, that their ends may receive sufficient paste to prevent the tubes from unrolling, a flexible and yielding roller, H', is placed directly beneath, and upon which the paste-roller H rests in pasting the last ends of the strips.

When sufficient paper to form the tubes shall have been wound around the mandrel and the rollers I J K and mandrel L stopped, as hereinbefore described, the knife $f'$ descends to sever the strips, carrying with it the paste box and roller H, the knife to sever the strips and the paste-roller at the same time to deposit sufficient paste to adhere the last ends of the strips to the bodies of the tubes.

To operate the knife to sever the strips of paper and to paste down their last ends upon the bodies and complete the tubes, and to raise the knife and paste-roller, so as to permit the ends of the strips to be moved forward by the flexible rollers E F to receive the mandrel for the next tube, a ratchet-wheel, I', and pawl $I^2$ are provided, the ratchet being mounted upon and secured to the shaft of the gear-wheel $I^3$, which gear-wheel takes into a smaller wheel, $I^4$, secured to the outer end of the shaft of the lowermost flexible roller, F.

To the shaft of the gear-wheel $I^3$ is fitted an adjustable slotted link-bar, Fig. 2, which is coupled to the end of the connecting-rod J', and to which the pawl $I^2$ is also pivoted. This slotted and adjustable link-connection serves to regulate the movement of the pawl $I^2$ in revolving the ratchet-wheel to turn the flexible rollers E F to move the pawl in the arc of the circle of the ratchet-wheel I'.

The opposite end of the connecting-rod J' is pivoted to the segment $J^2$ of a gear-wheel secured to the rock-shaft $J^3$, which segment takes into a corresponding segment, $J^4$, on the shaft L' of the gear-wheel M'.

To obtain the required intermittent movement of the mechanism to operate the knife $f'$ to sever the strips of paper, and to carry with the knife the paste-roller H, to paste the last ends of the strips, to prevent the tubes unrolling, the segment $J^4$, which is connected with the knife by means of a connecting-rod, $f^4$, and crank on shaft L', from its raised position, Fig. 3, is revolved a half-revolution and stops at its lowermost position, as in Fig. 4.

To raise the knife $f'$ and paste-roller H from the ends of the strips of paper, so as to permit the strips from the supply-roll to be again fed forward to the rollers and mandrel, the segment $J^4$, from its lowermost position, Fig. 4, is revolved a half-revolution, and the edge $i'$ thereof, striking against an elongated tooth, $i^3$, on the segment $J^2$, directs the cogs of both segments into gear, thereby revolving the segment $J^2$ a quarter of a revolution, raising the connecting-rod $f^4$ and pawl $I^2$ therewith, and revolving the flexible rollers E F, to carry the strips forward as required for the next tubes.

When the segment $J^4$ shall have made its half-revolution and become disengaged from the segment $J^2$, it drops back of its own gravity and the weight of the connecting-rod J', to be in position to make the next quarter-revolution, to revolve the flexible rollers E F, to feed forward the ends of the strips of paper for the next tubes. In this position it will be observed that before the edge $i'$ of the segment $J^4$ reaches the elongated cog-tooth on the segment $J^2$, the connecting-rod $f^4$, secured to the same shaft as the crank, will have raised the knife and paste-roller sufficiently, before the flexible rollers commence to revolve, to permit the strips to pass beneath them for the next tubes. To operate these segmental cog-wheels $J^2$ $J^4$, flexible rollers E F, knife $f'$, and paste-box G and paste-roller H intermittently and in unison, as required to perform their several functions of feeding the strips forward, severing them, and pasting their last ends down upon the tubes, and to raise the knife and paste-roller away from the strips, to permit them to be again fed forward for the next tubes, a cam, $m'$, is mounted upon the shaft of the cog-wheel $R^2$, with which cog-wheel it engages to operate these segments by means of the handle $m^4$ and friction-wheel $f$, constructed and operating the same as that described and represented in Fig. 5, to operate the mechanism to roll the paper around the mandrel, and to stop it when the tube shall have been rolled to the required thickness. After the strips shall have been severed and their ends pasted, and the knife and paste-roller moved away from the strips, the U-shaped cam, Fig. 13, operates the forked lever $w$, and again engages the clutch $t$ with the gear-wheel $x$, to revolve the rollers I J K, to complete the tubes by rolling the remaining pasted ends of the strips down upon the sides of the tubes.

To direct the ends of the strips around the mandrel in commencing to roll tubes, a series of self-adjusting guide-fingers, C', are provided, which are admitted into corresponding grooves, $C^2$, to receive them, formed in the roller J, (detached view, Fig. 10,) in order that they may nearly touch the mandrel upon which the tubes are rolled. In order that these guide-fingers C' shall recede from the mandrel as the paper thereon increases in thickness in rolling tubes, slotted connecting-bars D' are placed on the cross-bar S' and pivoted to bell-cranks D², and which bell-cranks are pivoted to the inside of the frame A. The short ends V' of these bell-cranks bear against lugs V², projecting downward from a sliding plate, S², to which these guide-fingers C' are bolted, so that as the roller I is raised by the increasing thickness of the paper on the mandrel in rolling the tubes, and the opposite ends T² of the hinged frame O are depressed, carrying downward therewith the slotted connecting-bars D', pivoted to the long arms of the bell-cranks D², and as the tubes being rolled continue to increase in thickness on the mandrel, the short arms V' of the bell-cranks D² bear against lugs V², projecting downward from the plate S', move the fingers C', secured to this plate, away, and permit the tubes to be finished without touching the fingers, as in Fig. 3, and when the adjustable roller is raised to remove the mandrel and finished tube thereon, the guide-fingers are forced still farther back, and so remain at a distance from the mandrel, Fig. 3, until the adjustable roller I is lowered, as in Fig. 4, when the fingers are again permitted to be drawn forward by springs $n^5$, in position to partly surround the mandrel. Similar guide-fingers, $r^5$, are secured to the cross-bar S on the end of the frame O, which continue to direct the ends of the strips between the rollers and around the mandrel after having left the guide-fingers C', as represented in Fig. 4.

The adjustable spring-roller I is grooved to receive the sliding fingers, as in detached view, Fig. 10.

The rollers I J are preferably fluted, as represented in Fig. 10, so as to revolve the mandrel with more certainty in rolling tubes, and to prevent its slipping between the rollers when the strips are held back by a strong tension exerted on the supply-roll and by the flexible rollers E F.

To remove the surplus paste which gathers on the smooth roller K, a spring-scraper, P⁴, is arranged so as to constantly press against the smooth surface thereof, thereby scraping off the paste and allowing tubes to be rolled without adhering thereto.

To obtain positive rotating movements to the rollers I J K, between which the tubes are rolled, a system of adjustable cog-wheels is arranged, as represented more clearly in Fig. 1.

To the ends of the rollers I J K are secured pinions of equal diameters and equal number of cogs, in order that the rollers shall rotate with equal velocity to revolve the mandrel placed between them.

In order that the pinions shall always remain in gear and revolve in the required direction independent of the constantly-varying diameter of the tubes being rolled, an intermediate cog-wheel is hung on adjustable bars, so that as the diameter of the tubes increases, or the roller is raised to remove the mandrel with tubes thereon and be replaced by another mandrel, the pinion pivoted to the end of these adjustable bars is raised therewith, and follows, still in gear, in the arc of the circle with the periphery of the intermediate cog-wheel.

To diminish or increase the thickness of the tubes being rolled, the adjustable stem $y$, against which the latch $a'$ rests, is raised or lowered, as the case may be, and is held in position by jam-nuts.

Having described the mechanism in detail for producing the required movements to roll tubes and finish them consecutively, one after another, from an endless web of paper cut into strips, the various operations may be repeated briefly, and the manner of effecting them.

From the supply-roll the web is first passed up and through revolving cutters D, by which it is divided into strips of the required width to form the tubes, thence carried forward between the flexible rollers E F, and thence to the system of rollers I J K, to receive the mandrel L on the ends thereof, to commence to roll the tubes. The mandrel having been introduced, the adjustable roller I is lowered thereon by the clutch $b$, operated by the handle $g$. In the downward movement of the adjustable roller I the guide-fingers C' move forward to start and guide the ends of the strips around the mandrel, and the upper guide-fingers, $r^5$, in front of the roller I, and secured to the frame O, assume their proper position around the mandrel to continue to direct the ends of the strips and the clutch $i$, engaged with the gear-wheel $x$, by means of the mechanism already described for the purpose. The rollers I J K are set in motion, and sufficient of the strips of paper wound around the mandrel to nearly form a tube of any given thickness, at which stage the clutch $t$ is automatically disengaged from the cog-wheel $x$ when the rollers and mandrel stop. The lever $m^4$ is now operated to revolve the clutch $m'$ a half-revolution, whereby the knife descends and severs the strips, and the paste-roller also descends at the same time and pastes the ends of the strips. This descent also operates the U-shaped cam, by which the rollers I J K are again set in motion to complete the tubes by rolling the remaining ends left between the mandrel and the knife, to paste down the ends of the strips upon the tubes and to finish them. The lever $g$ is now operated to raise the adjustable spring-roller I, to remove the mandrel with its completed tubes thereon. The lever $m^4$ is again operated to revolve the flexible rollers E F, to carry forward the ends of the strips between the rollers to receive the mandrel thereon, when the several operations are repeated to roll the next tube, and so on.

The driving-pulley A⁴, to impart motion to the rolling mechanism, is mounted upon a shaft secured to the side of the frame A. An intermediate gear-wheel, $d^4$, is also secured to the same shaft $c^4$, and which engages with the gear-wheel $x$ on the shaft of the adjustable spring-roller I.

The gear-wheel $x$ is loose on the shaft of the roller I, and revolves constantly with the belt-wheel $A^4$, and only becomes a driving-wheel when engaged with the clutch $t$, mounted on the same shaft therewith, the spiral feather $b'$ serving as a key to the clutch $t$.

In the two applications for patents numbered respectively 27,088 and 27,089, agreeably to Rule 42 of "Official Practice," it is not intended to repeat the claims in either application, notwithstanding both contain similar elements for similar purposes. The claims in each case are designed to be separate and distinct.

Having thus fully described my invention, what I claim therein as new, and desire to secure by Letters Patent, is—

1. In a machine for rolling paper tubes, the combination of a pair of rotating cutters, whereby the web from the roll of paper is cut or divided into a series of strips, so that several tubes may be rolled at the same time on the same mandrel, a pair of intermittently-rotating feed-rolls to present the ends of the strips of paper to the rolling mechanism, a series of winding-rollers arranged in the frame of the machine and in a vibrating frame, so as to be adjustable to each other, and a mandrel between said rollers, upon which mandrel the several tubes are rolled simultaneously, substantially as described.

2. In a machine for rolling paper tubes, the combination of a series of cutters, whereby the web of paper is cut or divided into a number of strips, so that several tubes may be rolled at the same time on the same mandrel, a pair of intermittently-rotating feed-rollers to present the ends of the strips of paper to the rolling mechanism, a series of winding-rollers, a mandrel upon which the tubes are rolled, a vertically-reciprocating knife to sever the strips of paper, and a vertically-reciprocating paste-box, arranged and operated substantially as described, so as to paste only the last ends of the strips forming the tubes, to prevent them unrolling, the tubes in this machine being rolled dry or without paste except on the ends of the strips, substantially as herein described.

3. In a machine for rolling paper tubes, the combination of a series of cutters, whereby the web from the roll of paper is severed or divided into a number of strips, so that several tubes may be rolled at the same time and upon one mandrel, a pair of intermittently-rotating feed-rollers, by which the ends of the strips of paper are fed to the rolling mechanism, a series of winding-rollers, between which a mandrel is placed upon which to wind the tubes, a vertically-reciprocating knife to sever the strips of paper, and a suitably-constructed paste-box, substantially as described, attached to the reciprocating knife, whereby, as the knife descends to sever the strips, the ends thereof are pasted to prevent the tubes unrolling, and a crank-connection and clutch with the driving mechanism of the machine, whereby said knife and pasting mechanism are operated simultaneously to sever the strips of paper and paste the ends thereof, substantially as herein set forth.

DANIEL E. POWERS.

Witnesses:
H. WIDMAYER,
JAMES PATTON.